US009840189B1

United States Patent
Anderson (10) Patent No.: US 9,840,189 B1
(45) Date of Patent: Dec. 12, 2017

(54) METHOD AND APPARATUS OF A FOLDABLE-REINSTALLABLE WIRELESS WARNING SYSTEM FOR TRANSPORTING OVERSIZE LOADS

(71) Applicant: Chris Anderson, Rogers, AR (US)

(72) Inventor: Chris Anderson, Rogers, AR (US)

(73) Assignee: TOWMATE, LLC, Rogers, AR (US)

( * ) Notice: Subject to any disclaimer, the term of this patent is extended or adjusted under 35 U.S.C. 154(b) by 0 days.

(21) Appl. No.: 15/373,493

(22) Filed: Dec. 9, 2016

(51) Int. Cl.
| | |
|---|---|
| *B60C 23/00* | (2006.01) |
| *B60Q 1/00* | (2006.01) |
| *B60Q 1/22* | (2006.01) |
| *B60Q 1/50* | (2006.01) |
| *B60Q 1/34* | (2006.01) |
| *B60Q 1/52* | (2006.01) |
| *B60Q 7/02* | (2006.01) |
| *G08B 5/22* | (2006.01) |
| *G08B 5/24* | (2006.01) |
| *B60Q 1/30* | (2006.01) |
| *G09F 17/00* | (2006.01) |
| *G09F 13/00* | (2006.01) |
| *G09F 21/04* | (2006.01) |

(52) U.S. Cl.
CPC .......... *B60Q 1/305* (2013.01); *G09F 13/005* (2013.01); *G09F 17/00* (2013.01); *G09F 21/04* (2013.01)

(58) Field of Classification Search
None
See application file for complete search history.

(56) References Cited

U.S. PATENT DOCUMENTS

| | | |
|---|---|---|
| 2,975,401 A | 3/1961 | Shupe |
| 3,691,366 A | 9/1972 | Spreuer |
| | (Continued) | |

FOREIGN PATENT DOCUMENTS

| | | |
|---|---|---|
| EP | 1314608 A1 | 5/2003 |
| EP | 1369838 A1 | 12/2003 |
| | (Continued) | |

OTHER PUBLICATIONS

"Wireless Tow Lights" by TowMate, Found Online [Apr. 10, 2017] (pp. 5) http://www.towmate.com/WirelessTowLights.

(Continued)

*Primary Examiner* — Steven Lim
*Assistant Examiner* — Muhammad Adnan
(74) *Attorney, Agent, or Firm* — Raj Abhyanker, P.C.

(57) ABSTRACT

Disclosed are a method and/or an apparatus of a foldable-reinstallable wireless warning system for transporting oversize loads. The system includes a transmitter unit, a towing receiver unit, a foldable banner, a battery enclosure, and a set of surface mounted lights. The transmitter unit is configured to transmit an encoded signal. The towing receiver unit is separate from the transmitter unit and is configured to receive and communicate the encoded signal to a radio receiver. The foldable banner has an oversize load warning message printed thereupon. The battery enclosure and the set of surface mounted lights are stitched onto the foldable banner. The radio receiver, a lithium-ion battery and a strobe light controller are housed in the battery enclosure. The set of surface mounted lights includes stop tail turn lights, strobe lights and D.O.T. lights.

4 Claims, 4 Drawing Sheets

(56) References Cited

U.S. PATENT DOCUMENTS

| | | | | |
|---|---|---|---|---|
| 4,859,982 A * | 8/1989 | Seaburg | ............... | B60Q 1/305 307/10.8 |
| 5,424,715 A | 6/1995 | Lietzow et al. | | |
| 5,426,414 A * | 6/1995 | Flatin | ............... | B60Q 1/503 116/28 R |
| 5,438,490 A | 8/1995 | Woodbury | | |
| 5,497,304 A | 3/1996 | Caine | | |
| 5,522,165 A * | 6/1996 | Molla | ............... | G09F 17/00 40/604 |
| 5,666,103 A | 9/1997 | Davis, Jr. | | |
| 6,100,801 A * | 8/2000 | Plummer | ............... | B60Q 1/305 307/10.8 |
| 6,195,925 B1 | 3/2001 | Werner | | |
| 6,218,952 B1 | 4/2001 | Borland et al. | | |
| 6,409,367 B1 | 6/2002 | Pratt | | |
| 6,778,077 B1 | 8/2004 | DeGraaf | | |
| 6,864,782 B1 * | 3/2005 | Aaron | ............... | B60Q 9/006 340/431 |
| 7,199,705 B1 * | 4/2007 | Mixon | ............... | B60Q 1/305 200/61.89 |
| 7,268,693 B2 * | 9/2007 | Bell | ............... | B60Q 1/305 340/425.5 |
| 7,347,597 B2 | 3/2008 | French | | |
| 7,557,699 B2 * | 7/2009 | Walton | ............... | B60Q 1/305 340/463 |
| 7,665,870 B2 * | 2/2010 | Golle | ............... | A41D 13/01 362/485 |
| 7,777,617 B2 * | 8/2010 | Oelrich | ............... | B60Q 1/22 340/435 |
| 7,780,323 B2 | 8/2010 | Nolle | | |
| 8,237,557 B1 | 8/2012 | Hertz et al. | | |
| 9,272,663 B2 | 3/2016 | Smith et al. | | |
| 9,557,049 B1 * | 1/2017 | Rapisarda | ............ | F21V 33/0008 |
| 2003/0140536 A1 * | 7/2003 | Bilyeu | ............... | G09F 21/04 40/574 |
| 2005/0126838 A1 * | 6/2005 | Vaughan | ............... | A63H 27/02 180/167 |
| 2006/0238317 A1 | 10/2006 | Colledge | | |
| 2007/0120654 A1 * | 5/2007 | Walton | ............... | B60Q 1/305 340/431 |
| 2008/0149791 A1 * | 6/2008 | Bradley | ............... | E04H 12/2253 248/220.21 |
| 2011/0242771 A1 * | 10/2011 | Bhattacharya | ......... | H05K 1/038 361/733 |
| 2012/0242228 A1 | 9/2012 | Douglas et al. | | |
| 2012/0280793 A1 * | 11/2012 | Fayfield | ............... | G08G 1/142 340/8.1 |
| 2013/0099698 A1 * | 4/2013 | Podd | ............... | H05B 37/029 315/297 |
| 2013/0305573 A1 * | 11/2013 | Nemeth | ............... | B42D 15/022 40/124.02 |
| 2014/0300462 A1 * | 10/2014 | Russ | ............... | B60Q 1/46 340/471 |
| 2014/0310998 A1 * | 10/2014 | Shoveller | ............... | G09F 13/06 40/541 |
| 2015/0306928 A1 * | 10/2015 | McCollum | ............ | B60T 13/662 340/431 |
| 2016/0320525 A1 * | 11/2016 | Brigham | ............... | G06Q 30/02 |
| 2016/0338483 A1 * | 11/2016 | Eccarius | ............ | A46B 15/0087 |
| 2016/0366504 A1 * | 12/2016 | James | ............... | G08B 3/10 |
| 2017/0145692 A1 * | 5/2017 | Zheng | ............... | E04C 2/296 |

FOREIGN PATENT DOCUMENTS

| | | |
|---|---|---|
| FR | 3037297 A1 | 12/2016 |
| GB | 2411458 A | 8/2005 |
| WO | 2013104113 A1 | 7/2013 |
| WO | 2015173791 A1 | 11/2015 |

OTHER PUBLICATIONS

"Wireless LED Tow-Light set" by Reese Towpower, Found Online [Apr. 10, 2017] (pp. 2) https://fccid.io/pdf.php?id=1449433.

"Wireless Battery Powered LED Tow Light—Portable Hazard Lights With Magnetic Base—Rechargeable" by Larson Electronics LLC, Found Online [Apr. 10, 2017] (pp. 4) http://www.larsonelectronics.com/images/product/specsheet/71368.pdf.

"Wireless Trailer Taillights" Nuts and Volts magazine, Jul. 2010, by Ron Newton (pp. 8) http://www.nutsvolts.com/magazine/article/wireless_trailer_taillights.

\* cited by examiner

METHOD AND APPARATUS OF A FOLDABLE-REINSTALLABLE WIRELESS WARNING SYSTEM FOR TRANSPORTING OVERSIZE LOADS

FIELD OF TECHNOLOGY

This disclosure relates generally to a method of improving safety indicia for hauling an oversize load, and more particularly, to a method and/or an apparatus of a foldable-reinstallable wireless warning system for transporting oversize loads.

BACKGROUND

Transporting oversize and/or overweight loads such as construction machines (e.g., cranes, front loaders, backhoes, etc.), pre-built homes, containers, construction elements (e.g., bridge beams, generators, windmill propellers, rocket stages, industrial equipment, campers etc.) make it unsafe for vehicles traveling behind them in absence of any warning signal. A driver of a towing vehicle transporting an oversize load may have to signal his intention (e.g., to turn, push and/or stop) to the driver of approaching vehicle traveling behind him. Oversize load, such as shipping containers are transported using an attachable dolly system, which may have no stop, tail, turn lights on the rear of the load. The shipping containers may run with no lights on the containers. The towing vehicle hauling the container may have lights built into the base of the towing vehicle. Further, a trailer that protrudes 4 or more feet behind the towing vehicle may visually block towing vehicle's taillights. For this reason, the trailer may be equipped with its own taillights. The towing vehicle may have a wired connection to the trailer's taillights.

The trailer's taillights may not be effective in warning traffic as they approach from behind. In absence of a proper light and/or overload sign, an approaching vehicle may fail to maintain safe distance from the trailer hauling the oversize load. This may lead to accidents. Further, there may be conditions when a taillight may not be efficient in indicating safety signs to the approaching traffic from behind. For example, when an approaching traffic is to be warned (e.g., requiring increased visibility of safety signs in poor visibility conditions, from large distances, at night, and/or other hazardous conditions etc.), the trailer's taillights may not be sufficient.

Conventional taillight and/or tow light system may require plug and play hardware installation of light bar that has to be fixed at the rear of the trailer and/or oversize load container. This installation may need to be wired. Any disconnection and/or electrical failure may result in failure of the warning system. Improper wiring in the taillight and/or tow light system may lead to blown fuses, and/or in extreme cases, overheating of wires which may result in a fire in the vehicle. Wiring in the taillight and/or tow light system may get complicated when towing large and/or more sophisticated trailers.

BRIEF DESCRIPTION

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

SUMMARY

A radio controlled wireless tow light system includes a transmitter unit, a towing receiver unit, a foldable banner, a battery enclosure, and a set of surface mounted lights (e.g. set of warning lights). The transmitter unit is configured to transmit an encoded signal. The towing receiver unit is separate from the transmitter unit and is configured for receiving the encoded signal from the transmitter unit and to communicate the encoded signal to a radio receiver. The foldable banner has an oversize load warning message printed thereupon. The battery enclosure is stitched onto the foldable banner. The radio receiver is housed in the battery enclosure along with a lithium-ion battery and a strobe light controller. The set of surface mounted lights is stitched directly onto the foldable banner. The set of surface mounted lights includes a set of flush mount 4 inch stop tail turn lights, a set of flush mount 4 inch strobe lights and a set of flush mount Department of Transportation lights (e.g., D.O.T. lights). The wiring goes from the battery enclosure having the lithium-ion battery, the strobe light controller and the radio receiver, to the set of surface mounted lights through the foldable banner.

The foldable banner may be attached to an oversize load container using a set of bungee cords. The battery enclosure may be hydro-dipped to create a metallic look to an exterior housing of the battery enclosure. A polyethylene material may be used to form the foldable banner.

One embodiment of the invention offers a foldable-reinstallable radio controlled wireless tow light system to give an effective warning to the traffic approaching an oversize load vehicle from behind. This radio controlled wireless tow light system may include a foldable banner that can be unfurled and/or strapped to the oversize load at the rear of the oversize load vehicle. This radio controlled wireless tow light system may include a set of flush mount 4 inch stop tail turn lights, a set of flush mount 4 inch D.O.T. lights, and a set of flush mount 4 inch strobes lights stitched onto the foldable banner. This radio controlled wireless tow light system may operate the set of flush mount 4 inch stop tail turn lights, the set of flush mount 4 inch strobes lights, and the set of flush mount 4 inch D.O.T. lights in the middle. A custom designed battery enclosure may be stitched and/or attached onto the foldable banner. The battery enclosure may have a built-in antenna mounted along with the towing receiver unit. This radio controlled wireless tow light system may be radio operated making it very easy for the user to utilize this foldable banner. The user may have warning lights on the rear of its oversize load container using this wireless tow light system.

The foldable banner of this radio controlled wireless tow light system may be powered through the lithium-ion battery. The battery enclosure may be stitched at the lower right hand corner of the foldable banner of the radio controlled wireless tow light system. The battery enclosure may also house the towing receiver unit and a strobe light controller. The battery enclosure may be very light-weighted attached to the foldable banner. The wiring of foldable banner may go from behind, through the banner (e.g., foldable banner) material to access the flat surface-mounted warning lights (e.g., set of stop-tail turn light, set of strobe lights and set of D.O.T. lights in the middle).

The radio controlled wireless tow light system may have a transmitter unit that may be plugged into the socket and/or chassis of the towing vehicle, which may create the electronic pulses. The electronic pulses may be converted to radio waves. Using an encoded message, a signal may be sent, and that signal may be decoded by the receiver and/or trans-receiver on the foldable banner. On receiving the encoded signal, the warning lights stitched to the foldable banner may alert the approaching vehicle. Based on functioning of the warning lights, the approaching vehicle may be able to know whether it is turn signal and/or a brake signal.

The radio controlled wireless tow light system may not transmit the tail light function. Even if there is a loss of communication in the transmitter and/or the receiver of the radio controlled wireless tow light system, there may be lighting on rear of the oversize load vehicle. The radio controlled wireless tow light system may allow for a continuous transmitted signal to maintain tail light function. The lights of the radio controlled wireless tow light system may be ON, whenever the lithium-ion battery is engaged and receives the signal.

The radio controlled wireless tow light system may include a charging station along with the system. The charging system may be mounted on the towing vehicle. When the foldable banner of the radio controlled wireless tow light system is not in use, the lithium-ion battery may be dis-engaged from the foldable banner and installed into the charging station.

The wireless transmitter unit of the radio controlled wireless tow light system may be at the rear of the towing vehicle where the socket is located. In another embodiment, a hardwired version of the radio controlled wireless tow light system may be installed into the chassis of the heavy duty towing vehicle (e.g., towing vehicle). The hardwired version of the radio controlled wireless tow light system may include a socket structured in a plug-in-style. The plug-in-style may be a 7-way RV, a 7-way truck style having 7 pins that are round, 4 pin round, 6 pin round, and/or 4-way flat. There may be a number of different ways for connecting trailer lights. The method of connecting the trailer lights may differ based on utility, manufacturer, and/or industry. The radio controlled wireless tow light system may eliminate the need of wires between trailer vehicle and the towing vehicle requiring conventional wired system. The radio controlled wireless tow light system may be installed at the rear of the cargo and/or oversize load container being towed.

The foldable banner of the radio controlled wireless tow light system may have an antenna encapsulated within the housing of the battery enclosure. The antenna may be a wire 5¾ inches long that may be a broadcasting antenna. The battery enclosure may have the lithium-ion battery that essentially has the towing receiver unit along with it.

The foldable banner of the radio controlled wireless tow light system may have the set of bungee cords to attach it to the rear of oversize load container. The set of bungee cords may allow the foldable banner to be attached and/or removed from the rear of oversize load container, when not in use. The foldable banner may be rolled up and kept anywhere and reinstalled back by attaching it to four corners using the set of bungee cords. The battery enclosure and/or holder may be inserted in an extruded PVC tube. The lithium-ion battery may simply engage into the metallic holder containment and/or housing. The extruded PVC tube may be hydrodipped to give a metallic finish and/or a desired design to its exterior. The receiver antenna of the towing receiver unit may be integrated in the battery enclosure. The battery enclosure may be mounted on the rollable surface of the foldable banner of the radio controlled wireless tow light system.

The foldable banner of the radio controlled wireless tow light system includes the surface mount 4 inch LED lights that may have minimal and/or short depth. The battery enclosure along with the set of warning lights may make the radio controlled wireless tow light system very light weight. The foldable banner of the radio controlled wireless tow light system may have lower left and right stop tail turn lights turning red and the upper left and right lights functioning as a strobe. The strobe functions, such as blinks and/or flashes per minute may be configured using built-in software. The strobe functions may be customized based on user requirements using the built-in software. The foldable banner of the radio controlled wireless tow light system may include three lights in the center area to help people recognize the commercial large load ahead.

The use of radio controlled wireless tow light system may eliminate the use of heavy hardware assembly that previously had to be installed and/or fixed on the rear of the oversize load vehicle. The foldable banner of the radio controlled wireless tow light system may be easy to roll out and reinstall using its four cornered set of bungee cords. The transmitter unit of the radio controlled wireless tow light system may plug into the towing vehicle (e.g., using 7-pin truck style). The set of flush mount 4 inch stop-tail turn lights of the foldable banner of the radio controlled wireless tow light system may be activated as the driver steps on the brake pedal and/or turn signal. In another embodiment, the strobes of the foldable banner of the radio controlled wireless tow light system may turn ON using the switch on the foldable banner of the radio controlled wireless tow light system.

DETAILED DESCRIPTION

A radio controlled wireless tow light system includes a transmitter unit 100, a towing receiver unit 300, a foldable banner 106, a battery enclosure 104, and a set of surface mounted warning lights (e.g., set of flush mount 4 inch stop tail turn lights 202, set of flush mount of 4 inch strobe lights 200 and set of flush mount D.O.T. lights 204). The transmitter unit 100 is configured to transmit an encoded signal 102. The towing receiver unit 300 is separate from the transmitter unit 100 and is configured for receiving the encoded signal 102 from the transmitter unit 100 and to communicate the encoded signal 102 to a radio receiver 308. The foldable banner 106 has an oversize load warning message printed thereupon. The battery enclosure 104 is stitched onto the foldable banner 106. The radio receiver 308 is housed in the battery enclosure 104 along with a lithium-ion battery 302 and a strobe light controller 304. The set of surface mounted warning lights (e.g., set of flush mount 4 inch stop tail turn lights 202, set of flush mount of 4 inch strobe lights 200 and set of flush mount D.O.T. lights 204) is stitched directly onto the foldable banner 106. The set of surface mounted warning lights includes a set of flush mount 4 inch stop tail turn lights 202, a set of flush mount 4 inch strobe lights 200 and a set of flush mount Department of Transportation lights (e.g., D.O.T. lights 204). The wiring goes from the battery enclosure 104 having the lithium-ion battery 302, the strobe light controller 304 and the radio receiver 308, to the set of surface mounted warning lights through the foldable banner 106.

The foldable banner 106 may be attached to an oversize load container 108 using a set of bungee cords 206. The battery enclosure 104 may be hydro-dipped to create a metallic look to an exterior housing of the battery enclosure 104. A polyethylene material may be used to form the foldable banner 106.

One embodiment of the invention offers a foldable-reinstallable radio controlled wireless tow light system to give an effective warning to the traffic approaching an oversize load vehicle (e.g., oversize load container 108) from behind. This radio controlled wireless tow light system may include a foldable banner 106 that can be unfurled and/or strapped to the oversize load at the rear of the oversize load vehicle 108. This radio controlled wireless tow light system may include the set of flush mount 4 inch stop tail turn lights 202, the set of flush mount 4 inch D.O.T. lights 204, and the set of flush mount 4 inch strobes lights 200 stitched onto the foldable banner 106. This radio controlled wireless tow light system may operate the set of flush mount 4 inch stop tail turn lights 202, the set of flush mount 4 inch strobes lights 200 and the set of flush mount 4 inch D.O.T. lights 204 in the middle. A custom designed battery enclosure 104 may be stitched and/or attached onto the foldable banner 106. The battery enclosure 104 may have a built-in antenna (e.g., radio receiver 308) mounted along with the towing receiver unit 300. This radio controlled wireless tow light system may be radio operated making it very easy for the user (e.g., driver 112) to utilize this foldable banner 106. The user (e.g., driver 112) may have warning lights (e.g., set of flush mount 4 inch stop tail turn lights 202, set of flush mount of 4 inch strobe lights 200 and set of flush mount D.O.T. lights 204) on the rear of its oversize load container 108 using this wireless tow light system.

The foldable banner 106 of this radio controlled wireless tow light system may be powered through the lithium-ion battery 302. The battery enclosure 104 may be stitched at the lower right hand corner of the foldable banner 106 of the radio controlled wireless tow light system. The battery enclosure 104 may also house the towing receiver unit 300 and a strobe light controller 304. The battery enclosure 104 may be very light-weighted attached to the foldable banner 106. The wiring of the foldable banner 106 may go from behind, through the banner (e.g., foldable banner 106) material to access the flat surface-mounted warning lights (e.g., set of flush mount 4 inch stop tail turn lights 202, set of flush mount of 4 inch strobe lights 200 and set of flush mount D.O.T. lights 204).

The radio controlled wireless tow light system may have the transmitter unit 100 that may be plugged into the socket and/or chassis of a towing vehicle 110, which may create the electronic pulses. The electronic pulses may be converted to radio waves. Using an encoded message, a signal may be sent (e.g., using the transmitter unit 100), and that signal may be decoded by the receiver (e.g., radio receiver 308) and/or trans-receiver on the foldable banner 106. On receiving the encoded signal 104, the warning lights (e.g., set of flush mount 4 inch stop tail turn lights 202, set of flush mount of 4 inch strobe lights 200 and set of flush mount D.O.T. lights 204) stitched to the foldable banner 106 may alert the approaching vehicle. Based on functioning of the warning lights (e.g., set of flush mount 4 inch stop tail turn lights 202, set of flush mount of 4 inch strobe lights 200 and set of flush mount D.O.T. lights 204), the approaching vehicle may be able to know whether it is turn signal and/or a brake signal (e.g., using the set of flush mount 4 inch stop tail turn lights 202).

The radio controlled wireless tow light system may not transmit the tail light (e.g., set of flush mount 4 inch stop tail turn lights 202) function. Even if there is a loss of communication in the transmitter (e.g., transmitter unit 100) and/or the receiver (e.g., towing receiver unit 300) of the radio controlled wireless tow light system, there may be lighting on rear of the oversize load vehicle 108. The radio controlled wireless tow light system may allow for a continuous transmitted signal to maintain tail light (e.g., set of flush mount 4 inch stop tail turn lights 202) function. The lights (e.g., set of flush mount 4 inch stop tail turn lights 202, set of flush mount of 4 inch strobe lights 200 and set of flush mount D.O.T. lights 204) of the radio controlled wireless tow light system may be ON, whenever the lithium-ion battery 302 is engaged and receives the signal (e.g., encoded signal 102).

The radio controlled wireless tow light system may include a charging station along with the system. The charging system may be mounted on the towing vehicle 110. When the foldable banner 106 of the radio controlled wireless tow light system is not in use, the lithium-ion battery 302 may be dis-engaged from the foldable banner 106 and installed into the charging station.

The wireless transmitter unit 100 of the radio controlled wireless tow light system may be at the rear of the towing vehicle 110 where the socket is located. In another embodiment, a hardwired version of the radio controlled wireless tow light system may be installed into the chassis of the heavy duty towing vehicle (e.g., towing vehicle 110). The hardwired version of the radio controlled wireless tow light system may include a socket structured in a plug-in-style. The plug-in-style may be a 7-way RV, a 7-way truck style having 7 pins that are round, 4 pin round, 6 pin round, and/or 4-way flat. There may be a number of different ways for connecting trailer lights (e.g., set of flush mount 4 inch stop tail turn lights 202, set of flush mount of 4 inch strobe lights 200 and set of flush mount D.O.T. lights 204). The method of connecting the trailer lights (e.g., set of flush mount 4 inch stop tail turn lights 202, set of flush mount of 4 inch strobe lights 200 and set of flush mount D.O.T. lights 204) may differ based on utility, manufacturer, and/or industry. The radio controlled wireless tow light system may eliminate the need of wires between trailer vehicle (e.g., oversize load container 108) and the towing vehicle 110 requiring conventional wired system. The radio controlled wireless tow light system may be installed at the rear of the cargo and/or the oversize load container 108 being towed.

The foldable banner 106 of the radio controlled wireless tow light system may have an antenna (e.g., radio receiver 308) encapsulated within the housing of the battery enclosure 104. The antenna (e.g., radio receiver 308) may be a wire 5¾ inches long that may be a broadcasting antenna. The battery enclosure 104 may have the lithium-ion battery 302 that essentially has the towing receiver unit 300 along with it.

The foldable banner 106 of the radio controlled wireless tow light system may have the set of bungee cords 206 to attach it to the rear of the oversize load container 108. The set of bungee cords 206 may allow the foldable banner 106 to be attached and/or removed from rear of the oversize load container 108, when not in use. The foldable banner 106 may be rolled up and kept anywhere and reinstalled back by attaching it to four corners using the set of bungee cords 206. The battery enclosure 104 and/or holder may be inserted in an extruded PVC tube. The lithium-ion battery 302 may simply engage into the metallic holder containment and/or housing. The extruded PVC tube may be hydrodipped to give a metallic finish and/or a desired design to its exterior. The receiver antenna (e.g., radio receiver 308) of the towing receiver unit 300 may be integrated in the battery enclosure 104. The battery enclosure 104 may be mounted on the rollable surface of the foldable banner 106 of the radio controlled wireless tow light system.

The foldable banner 106 of the radio controlled wireless tow light system includes the surface mount 4 inch LED lights (e.g., set of flush mount 4 inch stop tail turn lights 202, set of flush mount of 4 inch strobe lights 200 and set of flush mount D.O.T. lights 204) that may have minimal and/or short depth. The battery enclosure 104 along with the set of warning lights (e.g., set of flush mount 4 inch stop tail turn lights 202, set of flush mount of 4 inch strobe lights 200 and set of flush mount D.O.T. lights 204) may make the radio controlled wireless tow light system very light weight. The foldable banner 106 of the radio controlled wireless tow light system may have lower left and right stop tail turn lights (e.g., set of flush mount 4 inch stop tail turn lights 202) turning red and the upper left and right lights (e.g., set of flush mount 4 inch strobe lights 200) functioning as a strobe. The strobe functions (e.g., function of the set of flush mount 4 inch strobe lights 200), such as blinks and/or flashes per minute may be configured using built-in software 306. The strobe functions (e.g., function of the set of flush mount 4 inch strobe lights 200) may be customized based on user (e.g., driver 112) requirements using the built-in software 306. The foldable banner 106 of the radio controlled wireless tow light system may include three lights (e.g., set of flush mount D.O.T. lights 204) in the center area to help people recognize the commercial large load (e.g., oversize load container 108) ahead.

The use of radio controlled wireless tow light system may eliminate the use of heavy hardware assembly that previously had to be installed and/or fixed on the rear of the oversize load vehicle (e.g., oversize load container 108). The foldable banner 106 of the radio controlled wireless tow light system may be easy to roll out and reinstall using its four cornered set of bungee cords 206. The transmitter unit 100 of the radio controlled wireless tow light system may plug into the towing vehicle 110 (e.g., using 7-pin truck style). The set of flush mount 4 inch stop-tail turn lights 202 of the foldable banner 106 of the radio controlled wireless tow light system may be activated as the driver 112 steps on the brake pedal and/or turn signal (e.g., indicate using the set of flush mount 4 inch stop-tail turn lights 202). In another embodiment, the strobes (e.g., function of the set of flush mount 4 inch strobe lights 200) of the foldable banner 106 of the radio controlled wireless tow light system may turn ON using the switch on the foldable banner 106 of the radio controlled wireless tow light system.

Figure 1:
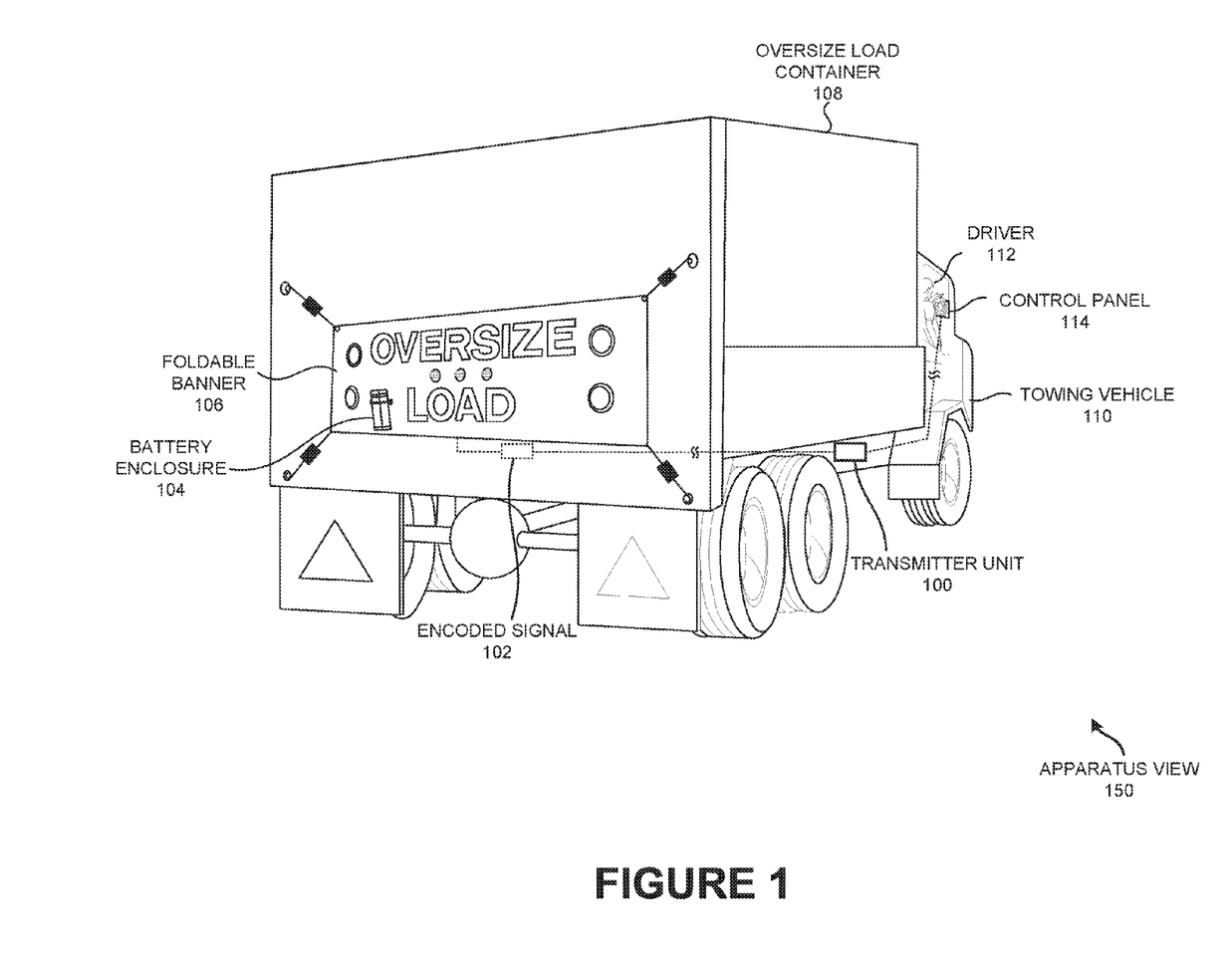
FIG. 1 is an apparatus view of a radio controlled wireless tow light system affixed to an oversize load container of a towing vehicle, according to one embodiment.

Disclosed are a method and/or an apparatus of a foldable-reinstallable wireless warning system for transporting oversize loads. FIG. 1 is an apparatus view 150 of a radio controlled wireless tow light system affixed to an oversize load container 108 of a towing vehicle 110, according to one embodiment. In particular, FIG. 1 shows a transmitter unit 100, an encoded signal 102, a battery enclosure 104, a foldable banner 106, the oversize load container 108, the towing vehicle 110, a driver 112, and a control panel 114, according to one embodiment.

FIG. 1 illustrates the towing vehicle 110 towing and/or hauling a large load in the oversize load container 108 with the foldable banner 106 attached to it, to warn the vehicle approaching from behind. The transmitter unit 100 may be an electronic device that generates an electronic signal and/or electronic pulses based on the driver's 112 action (e.g., applying brakes, turning, accelerating, decelerating, stopping) while driving the towing vehicle 110 and converts it to a radio wave signal. The transmitter unit 100 may be configured to transmit the encoded signal 102 generated based on the driver's 112 action. The transmitter unit 100 may radiate the resulting signal (e.g., encoded signal 102) from an antenna to a radio receiver 308 of a towing receiver unit 300 of the oversize load container 108. The transmitter unit 100 may be installed into the chassis of the heavy duty towing vehicle (e.g., towing vehicle 110), according to one embodiment.

In another embodiment, transmitter unit 100 may be plugged into the socket of heavy duty commercial vehicle or pick-up trucks (e.g., using 7 way truck style, that may be 7 pin round, 4 pin round, 6 pin round and/or 4 way flat). The transmitter unit 100 wirelessly attached to the towing vehicle 110 may create electronic signal based on the actions (e.g., brake and/or turn signal) performed by the driver 112 and convert that signal to the radio wave signal to travel variable distances, according to one embodiment.

The encoded signal 102 may be a signal converted for encrypted and/or seamless transmission of the electronic signal based on the driver's 110 action. Encoding of the electronic signal may reduce the number of bits to be transmitted and/or save bandwidth of the signal (e.g., encoded signal 102). The encoded signal 102 may be transmitted from the transmitter unit 100 of the towing vehicle 110. The encoded signal 102 may be received and thus decoded by the towing receiver unit 300 at the battery enclosure 104 stitched to the foldable banner 106 of the radio controlled wireless tow light system. The warning lights (e.g., set of flush mount 4 inch strobe lights 200, set of flush mount 4 inch stop-trail turn lights 202, and set of flush mount 4 inch D.O.T. lights 204) stitched (e.g., embedded tucked, stuck, affixed, connected, hooked-up, etc.) to the foldable banner 106 may function based on the signal (e.g., encoded signal 102) decoded at the towing receiver unit 300, according to one embodiment.

The battery enclosure 104 may be a lightweight cabinet for holding the towing receiver unit 300 along with the radio receiver 308, a lithium-ion battery 302 and a strobe light controller 304 of the foldable banner 106. The battery enclosure 104 may be stitched onto a lower right hand corner of the foldable banner 106. The battery enclosure 104 may protect its users from electrical shock and/or contents from the environment. The battery enclosure 104 may be fabricated from a plastic and/or a high strength, lightweight composite such as a carbon composite etc. In one example embodiment, the battery enclosure 104 may be hydro-dipped to create a metallic look to an exterior housing of the battery enclosure 104, according to one embodiment.

The foldable banner 106 may be a strip of cloth on which painted warning sign along with the battery enclosure 104 and a set of warning lights (e.g., the set of flush mount 4 inch strobe lights 200, the set of flush mount 4 inch stop-trail turn lights 202, and the set of flush mount 4 inch D.O.T. lights 204) are stitched to alert the traffic approaching from behind. The foldable banner 106 may have an oversize load warning message printed thereupon. The foldable banner 106 may be attached, hooked-up, strapped, stuck and/or connected to the rear of the oversize load container 108 with the help of metal eyelets and a set of bungee cords 206. The foldable banner 106 may be made up of polyethylene material, cloth, thin fabric, paper, plastic and/or the vinyl etc. that makes the banner foldable. The wiring goes from the battery enclosure 104, to the set of surface mounted lights through the foldable banner 106, according to one embodiment.

The oversize load container 108 may be a large vessel and/or a cargo container hauling oversize load attached to the towing vehicle 110. The oversize load container 108 may hold mega-sized loads that exceed standard weight limits. The foldable banner 106 may be attached to the rear of the oversize load container 108. The oversize load may be of construction machines (e.g., cranes, front loaders, backhoes, etc.), pre-built homes, containers, construction elements (e.g., bridge beams, generators, windmill propellers, rocket stages, industrial equipment, campers etc.) transported using the towing vehicle 110, according to one embodiment.

The towing vehicle 110 may be a hauling vehicle to which the oversize load container 108 is attached. The towing vehicle 110 may be a flatbed tow truck, a hook and chain tow truck, a wheel lift tow truck and/or tow truck with a dolly etc. The transmitter unit 100 of the radio controlled wireless tow light system may be installed into the chassis of the towing vehicle 110, according to one embodiment.

The driver 112 may be a person and/or entity driving the towing vehicle 110. The driver 112 may control all the operations (e.g., turn, brake etc.) of the towing vehicle 110. Based on the action taken by the driver 112, the transmitter unit 100 may transmit the encoded signal 102 to the radio receiver 308 of the towing receiver unit 300. The set of warning lights (e.g., the set of flush mount 4 inch strobe lights 200, the set of flush mount 4 inch stop-trail turn lights 202, and the set of flush mount 4 inch D.O.T. lights 204) stitched and/or embedded on the foldable banner 106 may function based on the encoded signal 102 received, according to one embodiment.

The control panel 114 may be a console and/or a dashboard which contains electrical components to control towing vehicle 110. The control panel 114 of the towing vehicle 110 may enable the driver 112 to perform a particular task of controlling the towing vehicle 110. The control panel 114 may be placed at the driver's (e.g., driver 112) cabin. The control panel 114 may include brake, accelerator and/or steering of the towing vehicle 110. The control panel 114 may be wirelessly connected to the transmitter unit 110 placed at the towing vehicle 110. The control panel 114 may also include the battery charging station. The battery charging station may be a socket in the towing vehicle 110 where the battery (e.g., lithium-ion battery 302) of the foldable banner 106 can be charged. If the foldable banner 106 is not in use, then the battery (e.g., lithium-ion battery 302) can be disengaged from the foldable banner 106 and installed at the battery charging station, according to one embodiment.

Figure 2:
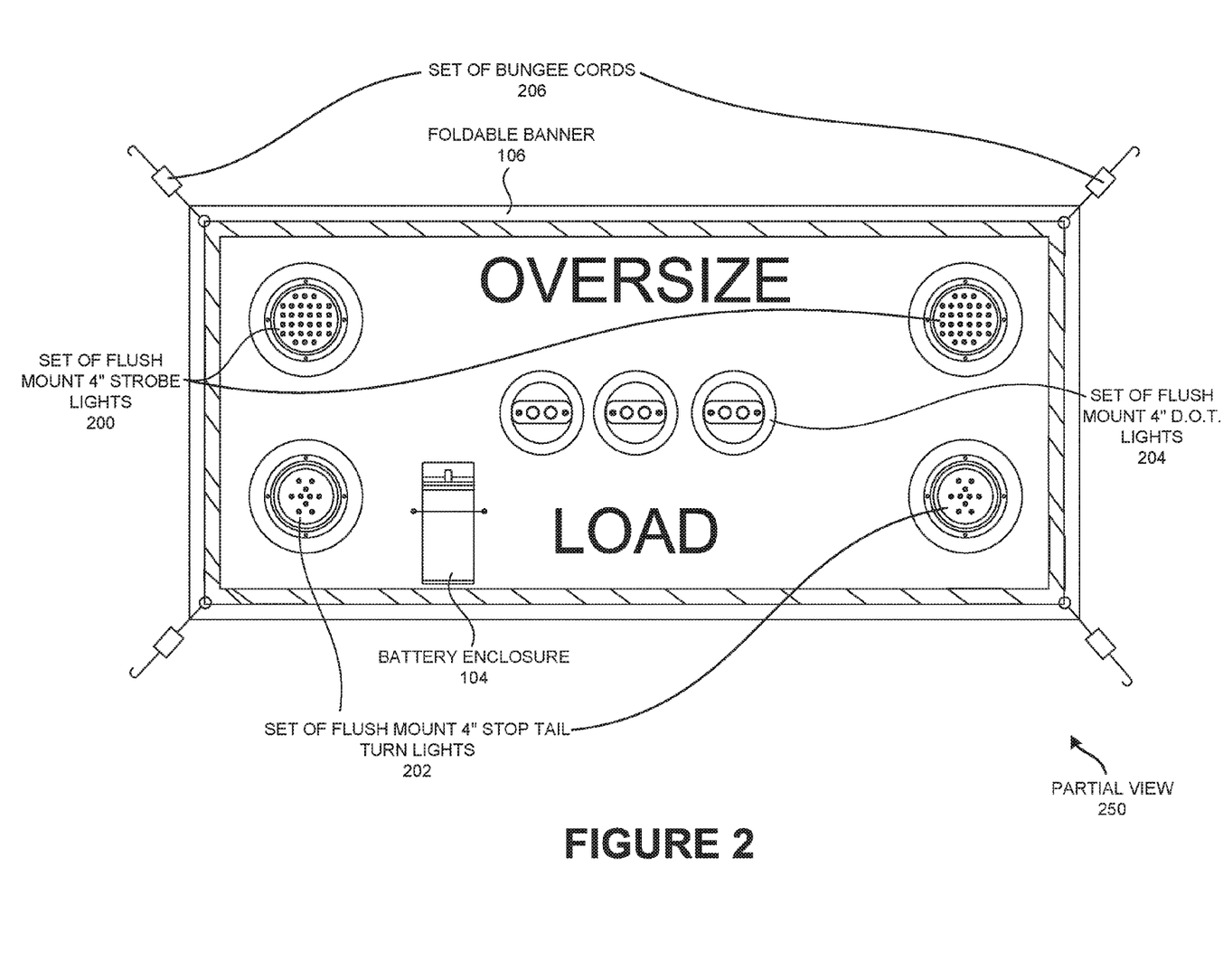
FIG. 2 is a partial view of a foldable banner of the radio controlled wireless tow light system of FIG. 1 affixed at the rear of the oversize load container of the towing vehicle, according to one embodiment.

FIG. 2 is a partial view of a foldable banner 106 of the radio controlled wireless tow light system of FIG. 1 affixed at the rear of the oversize load container 108 of the towing vehicle 110, according to one embodiment. FIG. 2 illustrates the set of flush mount 4 inch strobe lights 200, the set of flush mount 4 inch stop-tail turn lights 202, the set of flush mount 4 inch D.O.T. lights 204, and the set of bungee cords 206, according to one embodiment.

The set of flush mount 4 inch strobe lights 200 may be 4-inch flush mounted bright LED lights that flashes on and off very quickly. The set of flush mount 4 inch strobe lights 200 may be stitched at the upper left and upper right of the foldable banner 106 attached to the rear of the oversize load container 108. The set of flush mount 4 inch strobe lights 200 may be directly connected to the lithium-ion battery 302 placed inside the battery enclosure 104. In another embodiment, the set of flush mount 4 inch strobe lights 200 may be associated with the strobe light controller 304 to adjust the speed of flashes per second. The set of flush mount 4 inch strobe lights 200 may provide an appropriate warning signal to the traffic approaching the towing vehicle 110 from behind, according to one embodiment.

The set of flush mount 4 inch stop tail turn lights 202 may be 4 inch flush mounted LED lights that indicate directional signals (e.g., turn light signal), rear position signal (e.g., tail light signal), and/or brake signal (e.g., stop light signal) of the oversize load container 108. The set of flush mount 4 inch stop-tail turn lights 202 may be stitched at the lower left and lower right of the foldable banner 106 attached to the rear of the oversize load container 108. The set of flush mount 4 inch stop-tail turn lights 202 may be helpful in indicating the width of the oversize load container 108. The set of flush mount 4 inch stop-tail turn lights 202 may be directly connected to the lithium-ion battery 302 placed inside the battery enclosure 104, according to one embodiment.

The set of flush mount 4 inch stop-tail turn lights 202 may get activated every time the battery (e.g., lithium-ion battery 302) is engaged to indicate the rear position of the oversize load container 108. The directional signal (e.g., turn light signal) and/or the brake signal (e.g., stop light signal) may get activated based on the encoded signal 102 received at the towing receiver unit 300 of the oversize load container 108. There may be lighting on rear of the oversize load container 108, even if there is a loss of communication in the transmitter unit 100 and the towing receiver unit 300 of the radio controlled wireless tow light system, according to one embodiment.

The set of flush mount 4 inch D.O.T. lights 204 may be trailer LED lights compliant to the guidelines specified by the United States department of transportation for the oversize load containers (e.g., oversize load container 108). The set of flush mount 4 inch D.O.T. lights 204 may be stitched at the center area of the foldable banner 106, attached to the rear of the oversize load container 108. The set of flush mount 4 inch D.O.T. lights 204 may help approaching traffic to recognize the commercial large load (e.g., using the oversize load container 108) ahead. In another embodiment, the set of flush mount 4 inch D.O.T. lights 204 may be replaced by the set of I.C.C. lights, according to one embodiment.

The set of bungee cords 206 may be strong elasticized cords with hooks on each end to attach, hook-up, stuck and/or connect the foldable banner 106 to the rear of the oversize load container 108 as a warning sign. The set of bungee cords 206 with the foldable banner 106 may be removed from the rear of the oversize load container 108 when not in use. The foldable banner 106 may be reattached using the set of bungee cords 206 making the whole system reinstallable, according to one embodiment.

Figure 3:
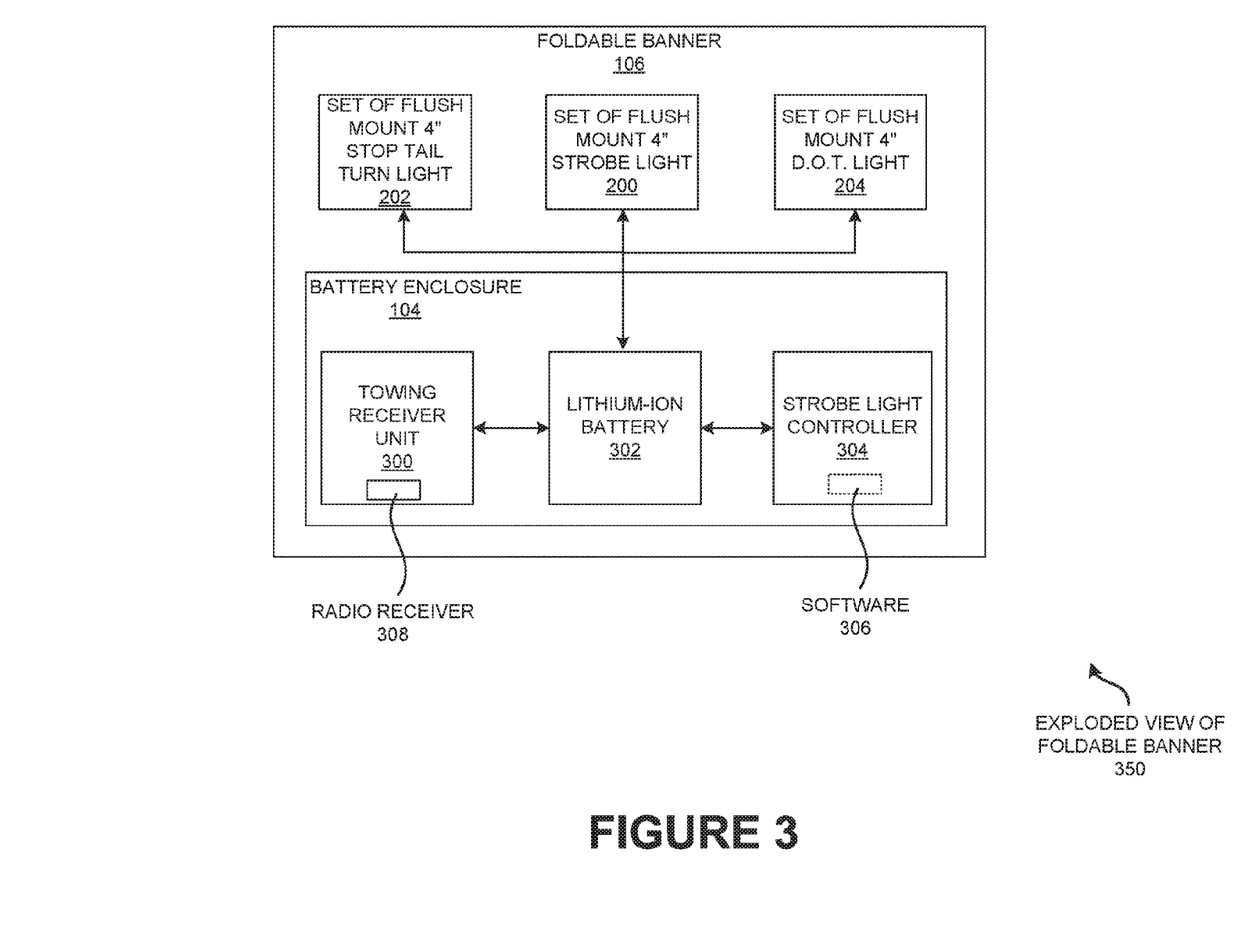
FIG. 3 is an exploded view of the foldable banner affixed at the rear of the oversize load container of FIG. 1, according to one embodiment.

FIG. 3 is an exploded view 350 of the foldable banner 106 affixed at the rear of the oversize load container 108 of FIG. 1 of the towing vehicle 110, according to one embodiment. FIG. 3 shows the towing receiver unit 300, the lithium-ion battery 302, the strobe light controller 304, a software 306, and the radio receiver 308, according to one embodiment.

The towing receiver unit 300 may be an electronic device that receives the radio wave signal (e.g., encoded signal 102)

transmitted from the transmitter unit 100 of the towing vehicle 110, with the help of the radio receiver 308. The towing receiver unit 300 may be separated from the transmitter unit 100 and may be configured to receive the encoded signal 102 from the transmitter unit 100. The towing receiver unit 300 may be placed inside the battery enclosure 104 of the foldable banner 106 attached to the oversize load container 108. The towing receiver unit 300 may decode the received signal (e.g., encoded signal 102). Based on the encoded signal 102 received at the radio receiver 308, the towing receiver unit 300 may activate the set of flush mount 4 inch strobe lights 200, the set of flush mount 4 inch stop-tail turn lights 202, and/or the set of flush mount 4 inch D.O.T. lights 204, according to one embodiment.

The lithium-ion battery 302 may be a light-weighed rechargeable battery composed of Lithium for stability and/or safety. The radio controlled wireless tow light system may be powered through a lithium-ion battery 302. The lithium-ion battery 302 may be placed inside the battery enclosure 104 of the foldable banner 106 attached to the oversize load container 108. The lithium-ion battery 302 may have wired connection to the set of flush mount 4 inch strobe lights 200, the set of flush mount 4 inch stop-tail turn lights 202 and/or the set of flush mount 4 inch D.O.T. lights 204, through the foldable banner 106. The lithium-ion battery 302 may be charged when required using the battery charging station. When the foldable banner 106 is not in use, the battery (e.g., lithium-ion battery 302) may be disengaged from the foldable banner 106 and installed at the battery charging station in the control panel 114 of the towing vehicle 110, according to one embodiment.

The strobe light controller 304 may be an electronic device used to operate the set of flush mount 4 inch strobe lights 200 stitched on the foldable banner 106 of the oversize load container 108. The strobe light controller 304 may be placed inside the battery enclosure 104 of the foldable banner 106 attached to the oversize load container 108. The strobe light controller 304 may control the speed of flashes and/or blinks per second of the set of flush mount 4 inch strobe lights 200 using the software 306, according to one embodiment.

The software 306 may be a program and/or a set of instructions (e.g., an application), used to manage and/or control the functions of the set of flush mount 4 inch strobe lights 200. The software 306 may be programmed to implement on the strobe light controller 304 to vary the speed of flashes of the set of flush mount 4 inch strobe lights 200. In another embodiment, the speed of flashes of the set of flush mount 4 inch strobe lights 200 may be controlled by making changes in the algorithm and/or program of the software 306 of the strobe light controller 304, according to one embodiment.

The radio receiver 308 may be an antenna to receive the encoded signal 102 transmitted from the transmitter unit 100 of the towing vehicle 110. The radio receiver 308 may be mounted on the towing receiver unit 300. The radio receiver 308 may be a wire 5¾ inches long that may be a broadcasting antenna, according to one embodiment.

Figure 4:
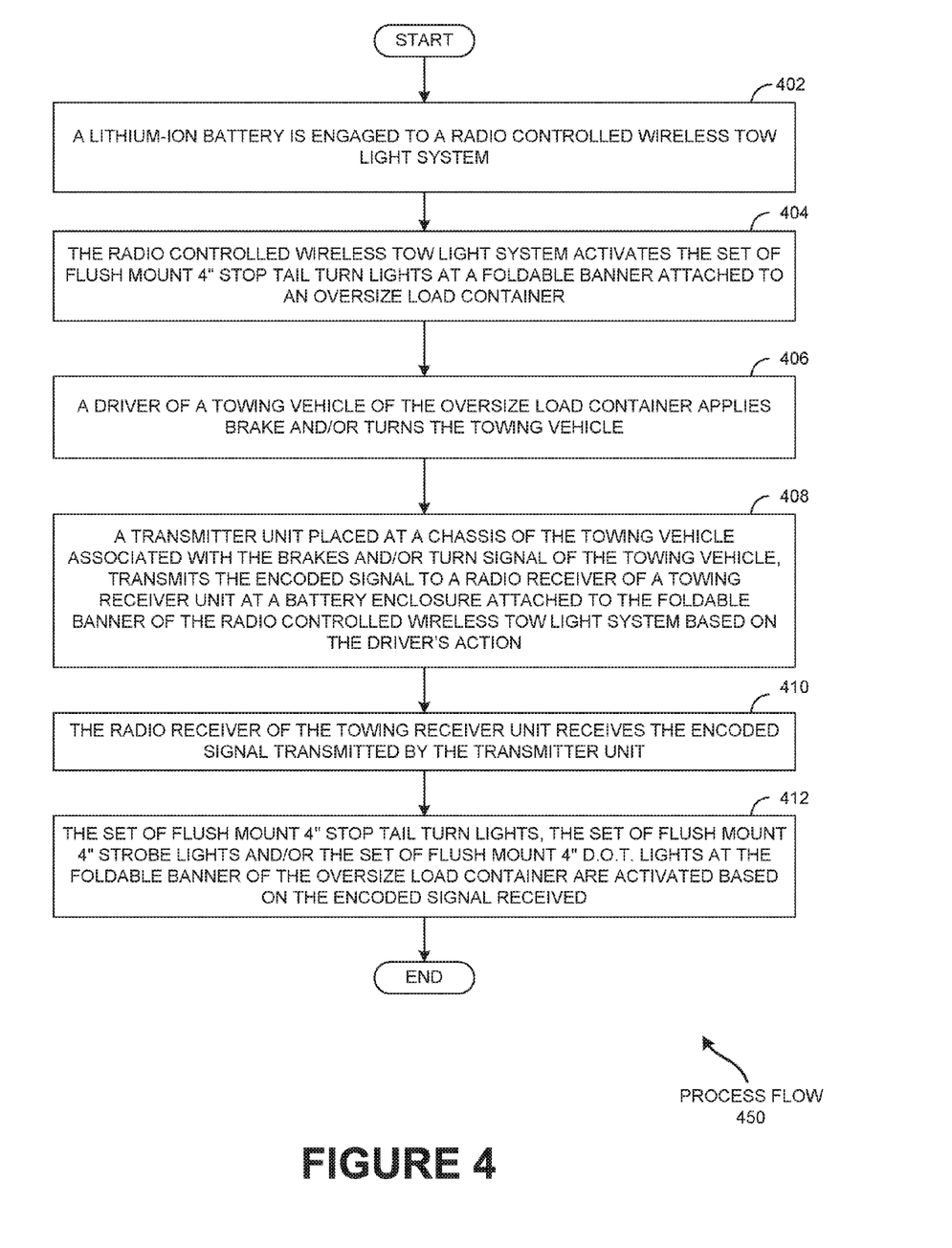
FIG. 4 is a process flow to warn the traffic approaching the towing vehicle of FIG. 1 using radio controlled wireless tow light system, according to one embodiment.

FIG. 4 is process flow to warn the traffic approaching the towing vehicle 110 of FIG. 1, according to one embodiment.

In operation 402, a lithium-ion battery 302 may be engaged to a radio controlled wireless tow light system, according to one embodiment. In operation 404, the radio controlled wireless tow light system may activate the tail lights (e.g., set of flush mount 4 inch stop tail turn lights 202) at the foldable banner 106 attached to the oversize load container 108, according to one embodiment. In operation 406, the driver 112 of the towing vehicle 110 of the oversize load container 108 may apply brake and/or turn the towing vehicle 110, according to one embodiment. In operation 408, the transmitter unit 100 placed at a chassis of the towing vehicle 110 associated with the brakes and/or turn signal of the towing vehicle 110 may transmit the encoded signal 102 to the radio receiver 308 of the towing receiver unit 300 at the battery enclosure 104 attached to the foldable banner 106 of the radio controlled wireless tow light system based on the driver's (e.g., driver 112) action, according to one embodiment.

In operation 410, the radio receiver 308 of the towing receiver unit 300 may receive the encoded signal 102 transmitted by the transmitter unit 100, according to one embodiment. In operation 412, the set of flush mount 4 inch stop-tail turn lights 202, the set of flush mount 4 inch strobe lights 200 and/or the set of flush mount 4 inch D.O.T. lights 204 at the foldable banner 106 of the oversize load container 108 may be activated based on the encoded signal 102 received, according to one embodiment.

An example embodiment will now be described. Jerry Walker may be working as a driver of heavy duty vehicles, in one of the leading transport company in the United States of America. His work profile may require transporting heavy containers to faraway places spread across the whole country. While transporting heavy containers he may have to be careful about safety of the traffic moving along in the same path. While driving he may have to apply brakes and/or turn his vehicle which may not be noticed by the driver of the following vehicles in absence of a proper light and/or overload sign. This may have led to accidents, causing damage to his vehicle as well loss of resources.

To overcome this recurring trouble, Jerry Walker's company may have installed radio controlled wireless tow light system described in various embodiments of FIGS. 1-4. The installation of new radio controlled wireless tow light system as described in various embodiments of FIGS. 1-4 may have helped Jerry Walker drive more safely minimizing accidental situations. The new apparatus described in various embodiments of FIGS. 1-4 installed in Jerry Walker's vehicle may be more efficient in indicating safety signs to the approaching traffic from behind. The control panel (e.g., control panel 114) of Jerry Walker's vehicle (e.g., towing vehicle 110) may now enable him to efficiently transmit his brake and/or turn signal to the set of warning lights (e.g., set of flush mount 4 inch strobe lights 200, set of flush mount 4 inch stop-trail turn lights 202, and set of flush mount 4 inch D.O.T. lights 204), alerting the following vehicles at once.

The warning system of Jerry Walker's vehicle described in various embodiments of FIGS. 1-4 may have enabled following vehicles to maintain safe distance after seeing the warning signs (e.g., foldable banner 106) even in poor light conditions and/or hazardous conditions. Jerry Walker may now be able to avoid the problem such as disconnection or electrical failure, overheating of wires, using the radio controlled wireless tow light system described in various embodiments of FIGS. 1-4. Jerry Walker may be able to wrap and reinstall the foldable banner 106 of the radio controlled wireless tow light system described in various embodiments of FIGS. 1-4 when not in use.

The various embodiments of FIGS. 1-4 radio controlled wireless tow light system may have helped Jerry Walker in reducing accidental situations, minimizing loss of resources and saving his transportation company's much valued capital.

A number embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps, data points and factors may be provided, or steps, data points and factors may be eliminated, from the described flows, and other components may be added to, or removed from, the described systems. Accordingly, other embodiments may within the scope of the following disclosure and/or claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A radio controlled wireless tow light system, comprising:
   a transmitter unit configured to transmit an encoded signal;
   a towing receiver unit separate from the transmitter unit and configured for receiving the encoded signal from the transmitter unit and to communicate the encoded signal to a radio receiver; a foldable banner having an oversize load warning message printed thereupon; a battery enclosure stitched onto the foldable banner,
   wherein the radio receiver is housed in the battery enclosure having a lithium-ion battery and a strobe light controller directly stitched onto the foldable banner; and
   a set of surface mounted lights stitched directly onto the foldable banner,
   wherein the set of surface mounted lights include a set of flush mount 4 inch stop tail turn lights, a set of flush mount of 4 inch strobe lights, and a set of flush mount Department of Transportation lights, and
   wherein wiring goes through foldable banner from the battery enclosure having the lithium-ion battery, the strobe light controller and the radio receiver to the set of surface mounted lights,
   wherein the battery enclosure provides power to the surface mounted lights, to the strobe light controller and to the towing receiver unit such that the tow light system remains operational when the radio receiver unit and the transmitter unit are electrically disconnected from each other.

2. The radio controlled wireless tow light system of claim 1 wherein the foldable banner is attached to an oversize load container using a set of bungee cords.

3. The radio controlled wireless tow light system of claim 1 wherein the battery enclosure is hydro-dipped to create a metallic look to an exterior housing of the battery enclosure.

4. The radio controlled wireless tow light system of claim 1 wherein a polyethylene material is used to form the foldable banner.

\* \* \* \* \*